United States Patent [19]

Tedesco

[11] Patent Number: 5,051,567
[45] Date of Patent: Sep. 24, 1991

[54] BAR CODE READER TO READ DIFFERENT BAR CODE FORMATS

[75] Inventor: Jack Tedesco, Manhatten Beach, Calif.

[73] Assignee: RJS, Inc., Monrovia, Calif.

[21] Appl. No.: 365,544

[22] Filed: Jun. 13, 1989

[51] Int. Cl.⁵ .............................................. G06K 7/12
[52] U.S. Cl. .................... 235/462; 235/454
[58] Field of Search .............. 235/462, 454, 439, 435, 235/465, 472; 250/553, 208.1, 208.3, 211 R, 568

[56] References Cited

U.S. PATENT DOCUMENTS

| | | |
|---|---|---|
| 3,163,700 | 12/1964 | Williamson ..................... 250/211 R |
| 3,218,909 | 11/1965 | Fain ..................................... 250/211 |
| 3,443,109 | 5/1969 | Broom .............................. 250/211 R |
| 3,564,267 | 2/1971 | Walter . |
| 3,610,891 | 10/1971 | Raciazek . |
| 3,663,803 | 5/1972 | Mohan et al. . |
| 3,812,325 | 5/1974 | Schmidt .............................. 235/462 |
| 3,832,529 | 8/1974 | Nakamura . |
| 3,853,403 | 12/1974 | Bentley . |
| 3,882,464 | 5/1975 | Zamkow . |
| 3,942,896 | 2/1976 | Schneider et al. . |
| 4,013,893 | 3/1977 | Hertig . |
| 4,025,442 | 5/1977 | Cass . |
| 4,034,230 | 7/1977 | Brill et al. . |
| 4,096,992 | 6/1978 | Nojiri et al. . |
| 4,136,821 | 1/1979 | Sugiura et al. . |
| 4,147,295 | 4/1979 | Nojiri et al. . |
| 4,282,425 | 8/1981 | Chadima, Jr. et al. . |
| 4,418,276 | 11/1983 | Yatsunami . |
| 4,473,746 | 9/1984 | Edmonds . |
| 4,488,679 | 12/1984 | Bockholt et al. ..................... 235/469 |
| 4,604,065 | 8/1986 | Frazer et al. ......................... 235/472 |
| 4,705,939 | 11/1987 | Ulinski, Sr. . |
| 4,742,220 | 5/1988 | Beyor .................................. 235/462 |
| 4,782,220 | 11/1988 | Shuren . |
| 4,818,886 | 4/1989 | Drucker .............................. 235/472 |

FOREIGN PATENT DOCUMENTS 227589A 1/1990 United Kingdom .

Primary Examiner—Stuart S. Levy
Assistant Examiner—Richard M. Weinberg
Attorney, Agent, or Firm—Arthur Freilich; Robert D. Hornbaker; Leon D. Rosen

[57] ABSTRACT

A bar code reader is decribed, which can accurately read bar codes with different minimum widths of dark and light elements. The reader includes a lens that forms an image of a portion of a bar code onto a detector assembly which includes a photocell. The photocell output is delivered to a detection circuit that detects the passage of images of light and dark elements across the photodetector. In one arrangement, the detector assembly defines a plurality of photocell devices have photosensitive regions of different areas, and a switch assembly connects a selected one of the photocell devices to the detector circuit. The detector assembly can includes several independent cells (52-58, FIG. 4) of different diameters, with one at a time connected to the detection circuit. The detector assembly can instead include several closely adjacent photocells (82-88, FIG. 5), with selected groups connected in parallel to the detection circuit. In another arrangement, a mask is provided, with holes (142-148, FIG. 7) of different diameters, and the mask can be moved so a selected one of the holes lies in front of a large photocell. In another arrangment, a zoom lens (112, FIG. 6) varies the magnification of the bar code image formed on a photocell. In another arrangement, a camera-type iris (162, FIG. 9) lies over a photocell.

9 Claims, 3 Drawing Sheets

BAR CODE READER TO READ DIFFERENT BAR CODE FORMATS

BACKGROUND OF THE INVENTION

One type of bar code reader includes a wand or other read head that can be drawn across a bar code, and which includes a lens for forming an image of a portion of the bar code onto a photocell. The photocell generates an electrical output of a magnitude dependent upon the amount of light thereon; the output is delivered to a detection circuit which detects the passage of light and dark bar elements across the photocell. Such bar code readers are useful both in identifying goods by their bar code, and in verifiers which can verify that a printed bar code label meets certain criteria that enables it to be reliably read by available bar code readers.

Different bar code formats are used in different geographic locations, wherein the densities of the bar code elements vary. That it, the minimum widths of the light and dark bar code elements are different for different types of bar codes. There are businesses that must read bar codes of different densities, such as warehouses that receive goods from different parts of the world bearing bar codes of different densities. Also, verifiers sometimes have to be used on bar codes of different densities. It may be noted that while previous verifiers tended to detect multiple characteristics along the width of each bar element, more recent standards have specified verifiers which act like readers used in stores and warehouses which have similar photocells in the readers.

The photocells which detect images of bar code elements passing thereacross, preferably have a diameter about 80% of the width of the bar elements of smallest width for the particular bar code to be read. Thus, in a bar code wherein the thinnest elements have a width of 10 mil (one mil equals one thousandth inch) and the optical magnification is one, the photocell preferably has a diameter of 8 mil. Where the optic magnification is four, the photocell preferably has a diameter of 32 mil. Low densities (wide bar elements) are useful as where bar codes are printed on cardboard containers, where the printing is often poor. High densities are useful for printing labels used on small items. Presently, different bar code densities are accommodated by replacing the reader head with a more appropriate one. A bar code reader, used either for product identification or verification of printed labels, which could accurately read bar codes of a range of densities with minimal additional, expense, would be of considerable value.

SUMMARY OF THE INVENTION

In accordance with one embodiment of the present invention, a relatively low cost bar code reader is provided which can read bar codes of different bar element densities. The reader includes a detector assembly on which an image of a portion of a bar code is formed, wherein the detector assembly includes a plurality of photocell devices having photocell regions of different areas. A switch apparatus is provided which can connect a selected one of the photocell devices to a detector circuit, to enable a selection of a photodetector area appropriate to a particular bar code density. In one arrangement, a plurality of photocells of different diameters are located adjacent to one another, and the output of a selected one of them is delivered to the detector circuit. In another arrangement, a plurality of closely spaced but separate photocells are provided, and the combined outputs of a selected group of the photocells is connected to the detector circuit.

In another arrangement, a mask is provided with different size openings which can be individually brought to lie over a photocell, to select a desired photocell diameter. The mask can include separate holes or an iris with a variable opening. In still another arrangement, a zoom lens is provided which forms an image of variable magnification onto a single photocell.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
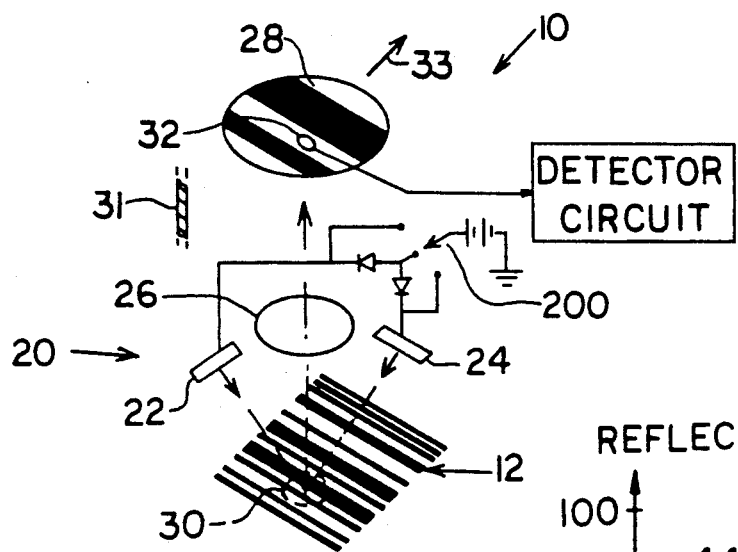
FIG. 1 is a simplified perspective view of a bar code scanner or reader of the prior art.
Figure 2:
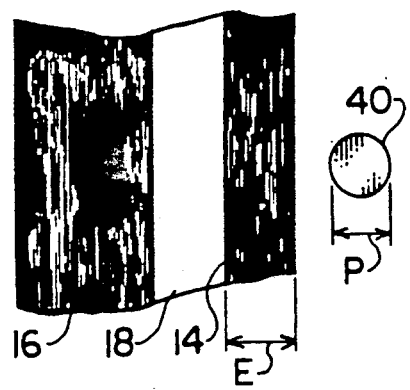
FIG. 2 is a plan view of a photocell and of a portion of a bar code that has been badly printed.

FIG. 1 illustrates a prior art bar code verifier or reader 10 for reading a bar code 12. As also shown in FIG. 2, the bar code has dark elements such as 14, 16 and light elements such as 18, with some elements having different widths. It should be noted that "dark" (nonreflective) and "light" (reflective) refer to the ability of the elements to reflect light of the wavelength(s) that are directed at it (e.g., black and red elements appear respectively nonreflective and reflective to red light, while carbon and noncarbon elements appear respectively nonreflective and reflective to infrared light). The reader includes a source of light 20 such as a pair of light emitting diodes 22, 24 that illuminate an area or portion of the bar code when the bar code lies at a particular position shown in FIG. 1. An optical device 26 is positioned to form an image 28 of a portion 30 of the bar code onto a detector assembly 32. The image 28 moves across the detector assembly, as in the direction of arrow 33, as by moving the reader relative to the bar code (either one can move). The optical device and detector assembly are held together by a housing 31. In the prior art reader shown, the detector assembly 32 includes a single photocell. The output of the photocell 32 is delivered to a detector circuit 34 which indicates the presence of particular bar code elements, as by delivering signals representing dark and light elements that are narrow and wide, to enable a determination of the number represented by the bar code.

Figure 3:
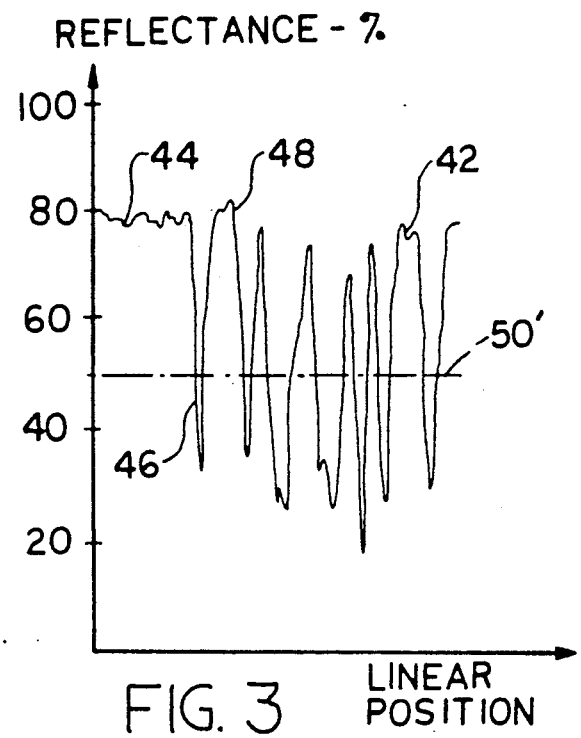
FIG. 3 is a graph showing the type of variation in reflectance with linear position along a bar code, which is commonly encountered.

Accurate reading of bar code elements depends upon how clearly they are printed and on the background of the surface on which they are printed. For example, bar codes printed on cardboard are often printed poorly, as indicated for element 14 in FIG. 2, and the reflectance of the unprinted cardboard area at 18 may be relatively low. It has been found that a photocell 40 having a diameter P equal to about 80% of the width E of the narrowest bar code element of a bar code, provides the greatest likelihood of correct readings. FIG. 3 includes a graph 42 showing variance in reflectance with linear position of a reader along a bar code. An initial value 44 is of maximum reflectance, and is followed by a narrow dark element indicated by graph portion 46. This is followed by a light bar element indicated by graph portion 48. For this bar code, a reflectance level of about 50%, indicated by line 50, differentiates light from dark elements, and the width of graph areas above or below the line 50 indicates the presence and width of light and dark bar elements.

The most common bar codes presently used include bar code elements of minimum widths of 7.5 mil (one mil equals one thousandth inch) to 13 mil (which require apertures of about 5 mil to 10 mil for reliable reading at a magnification of one). Work is presently being done to use bar codes with minimum element widths of 20 mil or more for printing on corrugated cardboard containers, and with minimum widths of 3 mil where printers can accurately print labels with such fine lines. For bar code readers used in warehouses that receive goods having bar code with different densities of bar code elements, it would be desirable if the reader could be easily switched for optimum reading of the different bar code densities. Presently, where wands containing a read head are used, a wand has to be removed and another one installed to read bar codes with different element densities. A similar situation can exist for verifiers which read samples of bar code labels or the like, to grade them (as with an "A," "B," or "C") to indicate their readability.

Figure 4:
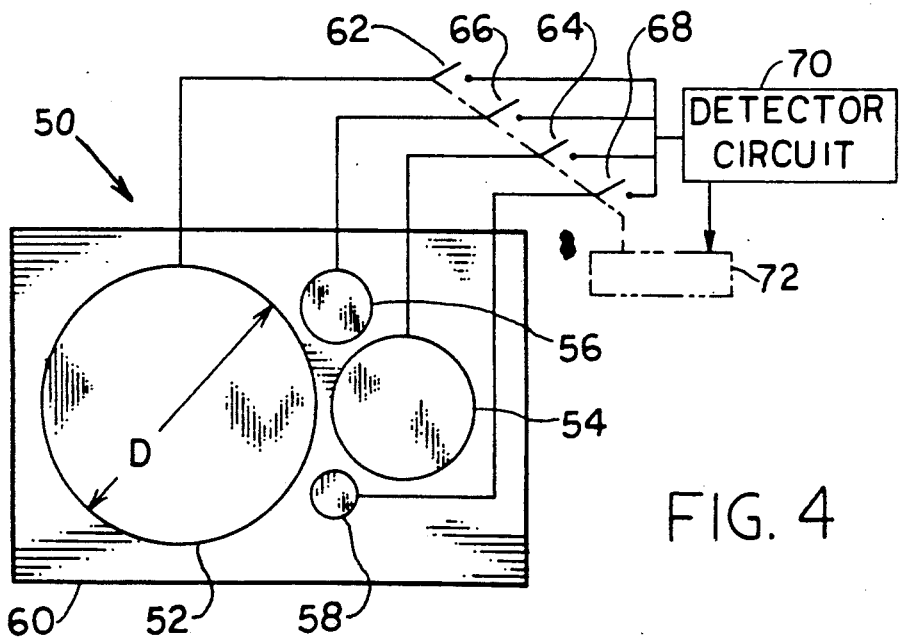
FIG. 4 is a plan view of a detector assembly constructed in accordance with one embodiment of the present invention, which employs a plurality of separate photocells of different sizes.

FIG. 4 illustrates a detector assembly 50 constructed in accordance with the present invention, which enables a selection of photocell devices of different widths, or diameters, so that a photocell device most appropriate for a particular bar code density can be selected. The particular detector assembly 50 includes four photocell devices or photocells 52-58 which are all round but which have different diameters D. All of the photocells lie on a common support 60 such a silicon wafer on which the different photocells have been formed. Each photocell has an output line that can be connected through a corresponding switch 62-68 to a detector circuit 70. For a particular bar code element density, a selected one of the switches 62-68 is closed and the output of the corresponding photocell is delivered to the detector circuit. The detector assembly 50 can be used in place of the detector assembly 32 in FIG. 1. It may be noted that ' some types of photocells generate a current that varies with the amount of light thereon. Another type varies in resistance with the amount of light thereon, and therefore when a current is passed through the photocell the voltage across the photocell varies with the amount of light thereon. In all of such cases, the photocell, in combination with circuitry connected thereto, generates an electrical signal of a magnitude (of voltage, current, etc.) dependent uponthelight thereon.

In a particular detector assembly 50 used in a bar code reader with a magnification of about 1.2, for reading bar code elements of a minimum width of 20 mol, 10 mil, 5 mil, or 3 mil; the photocells 52-58 have diameters D of 20 mil, 10 mil, 5 mil, and 3 mil respectively. For a bar code density other than the particular specified ones, a particular one of the photocells is selected which most accuately reads theh bar code. For example, the reader can include an automatic switch control indicated at 72, which switches between each of the four photocells 52-58 as a wand or reader head is scanned back and forth at least four times across a bar code. The read selects that one of the photocells which resulted in the beat readout, such as the greatest reflectance (for the light elemnts) and the widest dark elemnts. The reader then uses that photocell for readout of other bar codes of htesame format. Only when a new format is encountered, does the operator place the reader in a "tune" mode to select the most appropriate photocell.

The photocells 52-58 are located closely adjacent to one another, so that a relatively small optical system forms an image of the bar code elements that pass across all of the photocells 52-58. Also, all of the photocells lie on substantially a common plane (although the substantially planar surface can be slightly curved where this is required for sharp focus on all portions of the detector assembly). By positioning all photocells closely together, the detector assembly does not have to be moved in switching between the different photocells, but only has to be electronically switched.

Figure 5:
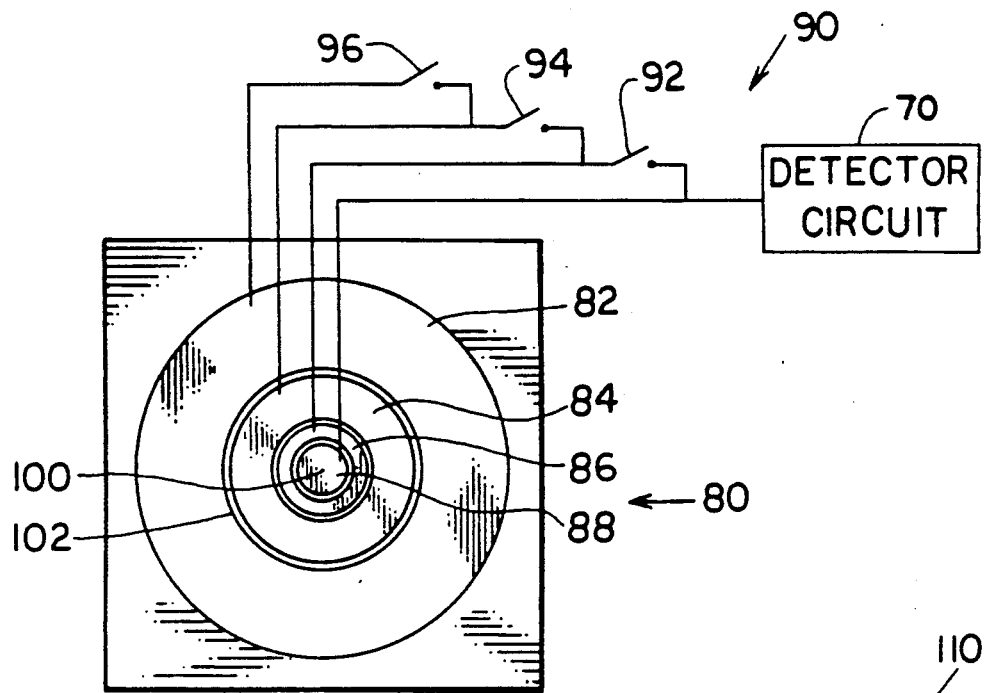
FIG. 5 is a plan view of a detector assembly constructed in accordance with another embodiment of the invention, wherein the detector assembly includes a plurality of concentric photocells.

FIG. 5 illustrates another detector assembly 80 which includes a plurality of closely spaced but separate photocells 82-88. A switch assembly 90 is constructed to deliver to the detector circuit 70, a signal representing the combined outputs of the photocells of any of a plurality of different groups of the photocells. In the readout of a bar code with elements of high density, the group of photocells includes only the photocell 88 whose output alone is delivered to the detector circuit 70. In that case all of the switches 92-96 of the switch assembly are open. For the next greater density of bar code elements, switch 92 is closed, so that the outputs of the two photocells 86 and 88 are delivered to the detector circuit 70. For a next lower density of bar code elements, the switch 94 may be closed to deliver the outputs of all three photocells 84-88 to the detector circuit. Finally, for the lower density, all of the switches are closed to deliver the outputs of all four photocells 82-88 to the detector circuit. The switch assembly 90 is shown for the case where the photocells generate current. Where the resistance of each photocell varies with light thereon, a different arrangement may be used depending on whether the resistance increases or decreases as the light increases.

Figure 5A:
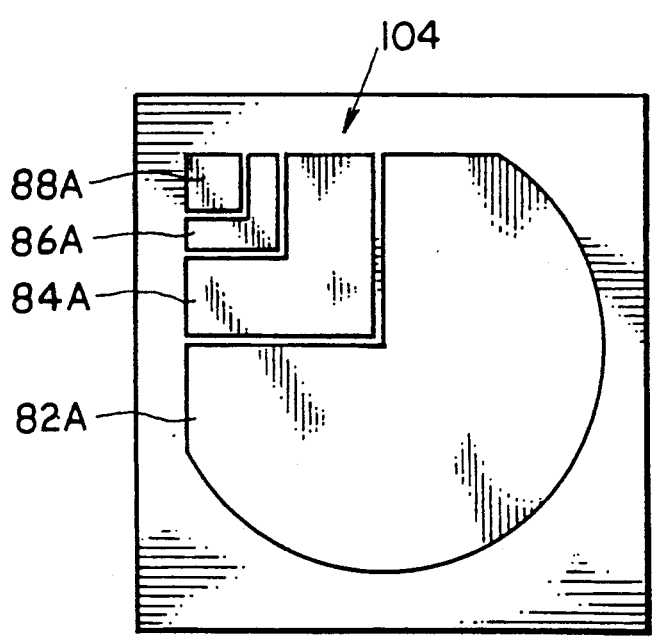
FIG. 5A is a plan view of a detector assembly which is a variation of the type shown in FIG. 5.

In the arrangement of FIG. 5, the photocells are concentric with an axis 100. Care must be taken that there is minimal "cross talk" between the photocells, and that the gaps between adjacent photocells are as small as possible. The inactive regions such as 102 within a circle encircling all of the photocells of set, preferably has an area less than one-fifth the active or signal-generating area of the combined set of photocells. It may be noted that an arrangement other than concentric can be used, such as the arrangement shown at 104 in FIG. 5A, which has photocells 82A–88A.

Figure 6:
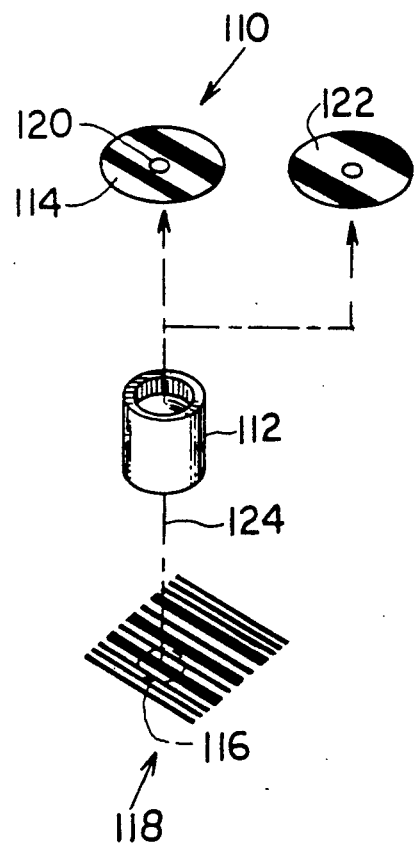
FIG. 6 is a simplified perspective view of a reader constructed in accordance with another embodiment of the invention, which uses an optical image forming apparatus of variable magnification.

FIG. 6 illustrates another reader 110 which includes an optical image forming apparatus 112 that can form an image 114 of an area 116 of a bar code 118 onto a detector assembly 120, at a plurality of different magnifications. The detector assembly 120 comprises a single photocell. The image at 122 represents a different magnification than the image 114. The optical image apparatus 112 comprises a zoom lens with multiple lenses that can be moved together and apart along, the optic axis 124 to vary the magnification. It is also possible to use separate lenses that can be individually brought into a location along the optic axis. In one example, the photocell 120 has a diameter of 8 mil, and a magnification of 1 is used for a bar code density where the minimum width of the bar code elements is 10 mil. For another bar code where the minimum element width is 20 mil, the magnification of the lens is set at 0.5. For a bar code with a minimum element width of 5 mil, the magnification is set at 2. It may be noted that as the magnification increases, the intensity of light in the image decreases, so a large magnification is generally not desirable.

Figure 7:
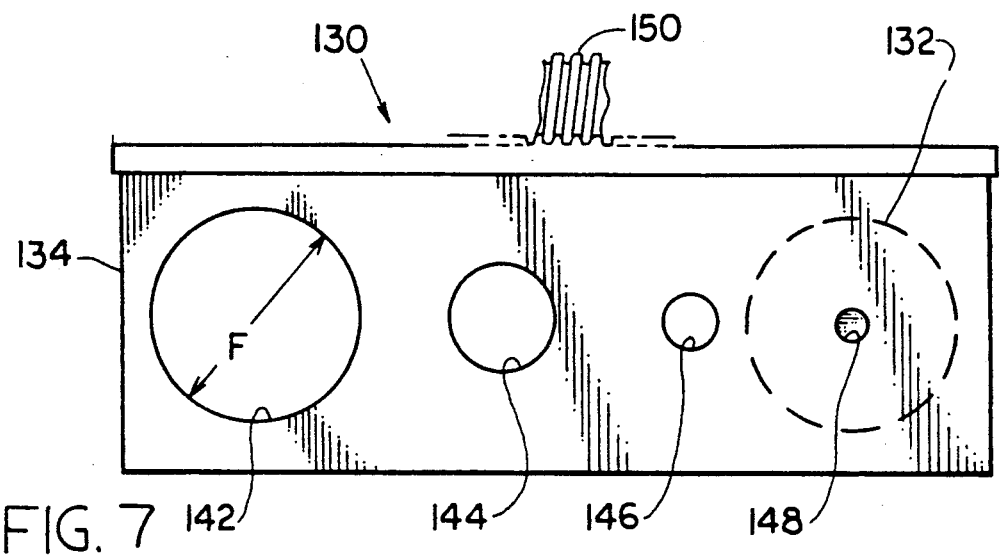
FIG. 7 is a plan view of a detector assembly of another embodiment of the invention which uses a mask with opening of different sizes.
Figure 8:
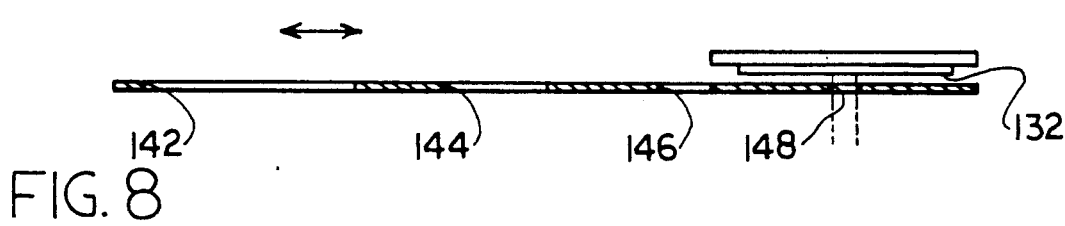
FIG. 8 is side elevation view of the detector assembly of FIG. 7.

FIGS. 7 and 8 illustrate another detector assembly 130 which uses a single photocell 132 and a mask device 134 which forms openings of different sizes. The mask has four holes 142–148 of different diameters F, and the mask is moveable to bring any one of holes in front of the photocell 132. The holes can be of the sizes described above (3 mil, 5 mil, 10 mil, and 20 mil) for a magnification of about 1.2. A wide variety of positioning devices are available, the drawing showing a lead screw 150 which engges teeth of a rack 152 on the mask. Thus, by providing a single stationary photocell 132 and a moveable mask with different size holes that can be brought into position in front of the photocell, applicant is able to readily change the effective diameter and area of the photocell of the detector assembly. The photosensitive region of a photocell device is the region (which may be the area of the aperture in a mask lying over one or more photocells) upon wich light may fall which affects the output of the photocell(s) (the current generated, the resistance, etc.).

Figure 9:
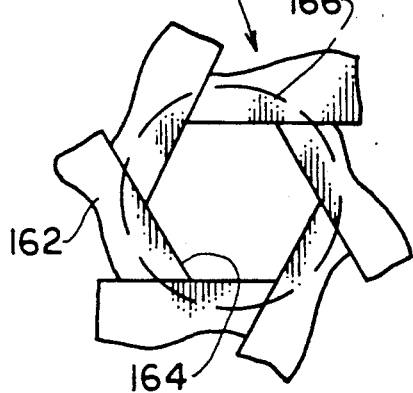
FIG. 9 is a plan view of a detector assembly constructed in accordance with another embodiment of the invention, which includes a variable opening iris.

FIG. 9 is a plan view of an other detector assembly 160 which includes an iris mechanism 162 which forms a somewhat circular paperture (about the same height as its width) in front of a photocell 166. The iris can be of the same type as used in cameras, and thearea of its opening can be varied according to the density of bar code elements of the bar code being read.

Figure 10:
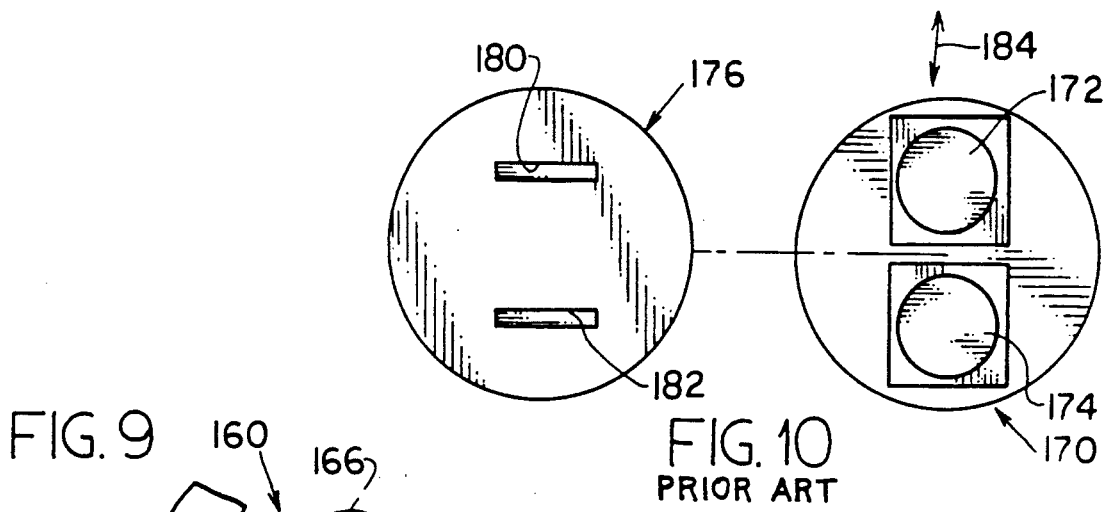
FIG. 10 is an exploded plan view of a detector assembly of the prior art used on a verifier.

FIG. 10 illustrates a detector assembly 170 of a type used in the prior art for a verifier scanner used to detect characteristics of a bar code to determine whether it meets certain specifications for accurate readout. The detector assembly includes two photocells 172, 174, and a prior art mask 176 posiitoned directly in front of the photocells. The mask included two narrow slits 180, 182. The reader head was moved so tha thte bar code image moved in the direction of arrows 183 across a bar code, with the long dimension of the slits parallel tothe long dimensions of the bar code elements. The two identical slts were used to detect the velocity of the reader head relative to the bar code (by noting the time for identical patterns to pass the two photocells) in addition to detecting the sharpness of the bar element edges, etc. New specifications for verification scanners call for the use of round apertures or cells to closely simulate detection by ordinary readers used in the field to determine the numbers represented by a bar code.

Figure 11:
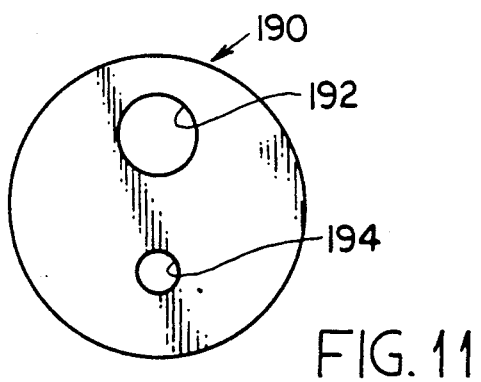
FIG. 11 is a plan view of a mask useful in the detector assembly of FIG. 10 in place of the prior art mask thereof.

Applicant is able to convert an existing scanner head portion of the type shown in FIG. 18 to the more recent specifications, by using a mask 190 shown in FIG. 11, in place, of the mask 176. The mask 190, includes, two apertures 192, 194 which the directly in front of the photocells 172, 174. The other change to the verification scariner is to replace the detection circuit that is connected to the outputs of the two cells, so a selected one of them is used at a given time to evaluate the clarity of the bar code. Replacement of the mask and detection circuit requires much less tooling costs than redesigning the entire scanner.

The spectrum of light that illuminates the bar code can affect the accuracy of reading. Bar codes are often printed with the ink and background chosen for maximum contrast at a particular wavelength. Typical readers employ wavelengths of 600 nm (nanometers) to 940 nm. The most recent specifications for verifiers state that light from sources (such a the light-emitting diodes 22, 24 of FIG. 1) should be incident at 45° to the plane of the bar code surface and parallel to the length of the bars. Where the reader has two light sources such as the diodes 22, 24, they can be selected to emit different wavelengths such as at 600 nm and 940 nm. A switch 200 can be used to allow energization of a single one of them, where this results in greater contrast in photocell output between the light and dark bars.

Thus, the invention provides improvements in bar code readers which enable a rapid selection of a detection assembly or device of desired size or area, in a simple and compact manner, which does not require movement of the photocell(s) of the detection assembly relative to the rest of the read head. Photocell devices of different sizes can be used which are connected through a switch apparatus to a detection circuit, where the switch apparatus selects the desired size. The photocell devices can include separate spaced photocells, of which a selected one is connected to the detector circuit., or several closely spaced photocells with the switching apparatus connecting the combined outputs of selected groups of the photocells to the detector circuit. A zoom lens or the like can be used to vary the magnification of the image of a bar code portion onto the detector apparatus. A single photocell can be used with a mask of different aperture s such as a mask with several separate apertures or an iris of continuously variable aperture size. A verifier scanner constructed to meet previous specifications, can be easily adapted to present specifications, by replacing the mask over the photocells and the circuitry connected to the photocell outputs.

Although particular embodiments of the invention have been described and illustrated herein, it is recognized that modifications and variations may readily occur to those skilled in the art and consequently it is intended to cover such modifications and equivalents.

What is claimed is:

1. In a bar code reader for reading bar codes having dark and light bar shaped elements of different densities, wherein some bar code formats have bars of different widths than those of other bar code formats, which includes a detector assembly that detects light incident thereon, optic means for forming an image of a portion of a bar code lying at a particular position onto said detector assembly and where the image moves relative to the detector assembly, and a detector circuit for indicating the presence of different bar code elements, the improvement wherein:

said detector assembly defines a plurality of photocell devices each having a photosensitive region of predetermined area, each photocell device generating an electrical signal of a magnitude dependent upon the amount of light incident on its photosensitive region;

switch means for connecting a selected one, but not other, of said photocell devices to said detector circuit, which optimizes reading of a particular bar code format, during the entire reading of at least one bar code having a plurality of said elements;

said photocell devices having photosensitive regions of different areas; and said optic means being constructed to form an image of said bar code portion onto all of said photocell devices during said relative movement.

2. The improvement described in claim 1 wherein: said plurality of photocell devices includes a plurality of substantially coplanar and closely spaced but separate photocells having light sensitive regions of different areas, with each photocell device having an outer edge and being constructed to detect substantially all light within said outer edge.

3. The improvement described in claim 1 wherein: said plurality of photocell devices includes a plurality of closely spaced individual photocells, and said switch means is constructed to deliver a signal to said detector circuit equal to the sum of the amplitudes of the outputs of a plurality of said photocells.

4. The improvement described in claim 3 wherein: said photocells have substantially circular peripheries of different diameters and lie concentric to each other, with small gaps between adjacent photocells, so the sum of the amplitudes of the outputs of the innermost and a plurality of adjacent photocells substantially equals the output of a circular photocell having the same diameter as the largest photocell.

5. The improvement described in claim 1 including: a plurality of light emitting devices which each emits light of a different spectrum, each positioned to illuminate said portion of said bar code; and means for energizing a selected one of said light emitting devices during the entire reading of at least one bar code having a plurality of said elements.

6. A bar code reader which can read bar codes each formed of elongated light and dark elements and wherein different bar code formats have different densities of bar code elements, comprising:

illuminating means for illuminating a bar code lying at a particular position;

a detector assembly which generates an electrical signal;

an optical device which forms an image of a portion of a bar code at said position onto said detector assembly, said optical device being relatively moveable across the bar code to focus portions of all code elements of the bar code onto the detector assembly;

a detector circuit coupled to said detector assembly and constructed to indicate the presence of different code elements;

said optical means being operable to form said image at any of a plurality of different selected magnifications onto said detector assembly, and including means for operating said optical device to select a magnification in accordance with the format of the bar code at said position.

7. A method for reading bar codes that each includes a plurality of dark and light bar code elements, wherein different bar codes may be encountered in which the elements in one bar code may have a greatly different width than the elements in another bar coe, comprising:

establishing a detector assembly which contains at least two photocell devices;

establishing a detector circuit for indicating the presence of differnt bar code elements;

forming an image of a portion of a bar code onto all photocell devices of said detector apparatus and moving the image relative to the detector assembly, until images of portions of all of the elments of the bar code have moved past the detector assembly;

connecting a selected one of said photocell devices, but not the other of said photocell devices, to said detector circuit during a period when images of portions of all the elements of a bar code have moved past the detector assembly. assembly and where the image moves relative to the detector assembly, and a detector circuit for indicating the presence of different bar code elements, the improvement wherein:

said detector assembly defines a plurality of photocell devices each having a photosensitive region of predetermined area, each photocell device generating an electrical signal of a magnitude dependent upon the amount of light incident on its photosensitive region;

switch means for connecting a selected one, but not other, of said photocell devices to said detector circuit, which optimizes reading of a particular bar code format, during the entire reading of at least one bar code having a plurality of said elements;

said photocell devices having photosensitive regions of different areas, and said optic means being constructed to form an image of said bar code portion onto all of said photocell devices during said relative movement.

8. A bar code reader which can read bar codes each formed of elongated light and dark elements and wherein different bar code formats have different densities of bar code elements, comprising:

a source of light positioned to illuminate a bar code lying at a particular position;

a detector assembly which generates an electrical signal;

an optical device positioned to form an image of a portion of a bar code lying at said position onto said detector assembly, said optical device being relatively moveable across the bar code to focus portions of all bar code elements of the bar code onto the detector assembly;

a detector circuit coupled to said detector assembly and constructed to indicate the presence of different code elements;

said detector assembly including a plurality of closely spaced but separate photocells that each have a light sensitive region and that are each constructed to generate an electrical signal of a magnitude dependent on the amount of light incident on the entire light sensitive region of the photocell, said plurality of photocells being closely spaced and lying substantially in a common plane and substantially equally spaced from said optical device, so the bar code image falls on all of said photocells as the optical device moves across the bar code;

said plurality of photocells each having a light sensitive region of a different effective area, and said detector assembly having a switch assembly arranged to connect a selected one of said photocells to said detector circuit so the signal delivered to said detector circuit equals the output from a single one of said photocells.

said source of light includes a plurality of energizable light emitting devices spaced about the path of light extending through said optic means from said portion of a bar code at said position;

said light emitting devices are each constructed to emit light of a different narrow bandwidth;

said switch assembly being constructed to energize only a selected one of said light emitting devices during the reading of an entire bar code containing a plurality of elements.

9. A bar code reader which can read bar codes each formed of elongated light and dark elements and wherein different bar code formats have different densities of bar code elements, comprising:

a source of light positioned to illuminate a bar code lying at a particular position;

a detector assembly which generates an electrical signal;

an optical device positioned to form an image of a portion of a bar code at said position onto said detector assembly, said optical device being relatively moveable across the bar code to focus portions of all code elements of the bar code onto the detector assembly;

a detector circuit coupled to said detector assembly and constructed to indicate the presence of different code elements;

said detector assembly including a plurality of closely spaced but separate concentric photocells that each have a light sensitive region and that are each constructed to generate an electrical signal of a magnitude dependent on the amount of light incident on the light sensitive region thereof, said plurality of photocells being closely spaced and lying substantially in a common plane so the bar code image falls on all of said photocells as the optic means moves across the bar code;

said detector assembly including a switch assembly constructed to deliver to said detector circuit a signal representing the combined outputs of the photocells of any of a plurality of different groups of said photo cells, with each group including a photocell of largest diameter and all photocells lying within it, so the signal delivered to said detector circuit equals the output from a single photocell covering the same areas occupied by said plurality of photocells.

* * * * *